(12) United States Patent
Parsoneault et al.

(10) Patent No.: US 9,470,261 B2
(45) Date of Patent: Oct. 18, 2016

(54) ADJUSTABLE GAP FOR A FLUID DYNAMIC BEARING

(75) Inventors: Norbert Steven Parsoneault, Scotts Valley, CA (US); Troy Michael Herndon, San Jose, CA (US); Alexander Gredinberg, San Jose, CA (US); Robert A. Nottingham, Santa Cruz, CA (US)

(73) Assignee: Seagate Techonology LLC, Cupertino, CA (US)

( * ) Notice: Subject to any disclaimer, the term of this patent is extended or adjusted under 35 U.S.C. 154(b) by 1111 days.

(21) Appl. No.: 13/105,618

(22) Filed: May 11, 2011

(65) Prior Publication Data

US 2012/0288222 A1 Nov. 15, 2012

(51) Int. Cl.

| F16C 17/10 | (2006.01) |
|---|---|
| F16C 17/22 | (2006.01) |
| F16C 17/24 | (2006.01) |
| F16C 33/10 | (2006.01) |
| G11B 19/20 | (2006.01) |

(52) U.S. Cl.
CPC ............. *F16C 17/10* (2013.01); *F16C 17/243* (2013.01); *F16C 33/1085* (2013.01); *G11B 19/2036* (2013.01); *F16C 2240/40* (2013.01); *F16C 2240/46* (2013.01); *F16C 2370/12* (2013.01)

(58) Field of Classification Search
CPC .. F16C 33/107; F16C 2370/12; F16C 17/10; F16C 17/243; H02K 5/16–5/1677
USPC ......... 310/90.5, 90; 384/100, 107, 110, 114, 384/121
See application file for complete search history.

(56) References Cited

U.S. PATENT DOCUMENTS

| 6,010,246 | A | * | 1/2000 | Gomyo et al. ................ 384/115 |
| 6,836,388 | B2 | | 12/2004 | Nishimura et al. |
| 7,015,611 | B2 | * | 3/2006 | Tokunaga et al. ............. 310/90 |
| 7,399,120 | B2 | * | 7/2008 | Yamada ........................ 384/107 |
| 2003/0231813 | A1 | * | 12/2003 | Gomyo et al. ................ 384/107 |
| 2003/0235007 | A1 | | 12/2003 | Parsoneault et al. |
| 2005/0140220 | A1 | * | 6/2005 | Tsuda et al. ................ 310/67 R |
| 2007/0258670 | A1 | | 11/2007 | Akahori |
| 2008/0101738 | A1 | * | 5/2008 | Parsoneault ............ F16C 33/10 384/107 |
| 2008/0317392 | A1 | | 12/2008 | Aiello et al. |
| 2009/0052817 | A1 | | 2/2009 | Leblanc et al. |

OTHER PUBLICATIONS

"Couple, v." OED Online. Oxford University Press, Mar. 2015. Web. Mar. 21, 2015.*
"Sleeve." Merriam-Webster.com. Merriam-Webster, n.d. Web. Aug. 11, 2015. <http://www.merriam-webster.com/dictionary/sleeve>.*
International Search Report, PCT/US2012/035002, mailed Nov. 30, 2012, 3 pages.

* cited by examiner

*Primary Examiner* — Thomas Truong

(57) ABSTRACT

A fluid bearing motor. The fluid bearing motor includes a stationary sleeve, a backiron, a hub coupled to the backiron, and a gap forming component. The hub is operable to rotate with respect to the stationary sleeve. The gap forming component is attached to the stationary sleeve and forms a gap between the stationary sleeve and the backiron. The size of the gap dynamically changes in response to changes in temperature.

5 Claims, 4 Drawing Sheets

ADJUSTABLE GAP FOR A FLUID DYNAMIC BEARING

TECHNICAL FIELD

Embodiments of the present invention relate to fluid dynamic bearings. More specifically, embodiments of the present invention relate to a gap formation for providing resistance to oil evaporation.

BACKGROUND

Disc drive memories are used in many electronic devices, e.g., personal computers (PC), portable computers, digital cameras, digital video cameras, video game consoles, personal music players, etc. Disc drive memories store digital information recorded on concentric tracks of a magnetic disc medium.

Usually one disc is rotatably mounted on a spindle and the information stored within the disc is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator.

One conventional disc drive utilizes a spindle motor with a fluid dynamic bearing (FDB) to support the hub and discs for rotation. The bearing reduces wear and tear along by reducing friction while maintaining the alignment between the spindle and the shaft.

SUMMARY

A fluid bearing motor. The fluid bearing motor includes a stationary sleeve, a backiron, a hub coupled to the backiron, and a gap forming component. The hub is operable to rotate with respect to the stationary sleeve. The gap forming component is attached to the stationary sleeve and forms a gap between the stationary sleeve and the backiron. The size of the gap dynamically changes in response to changes in temperature.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
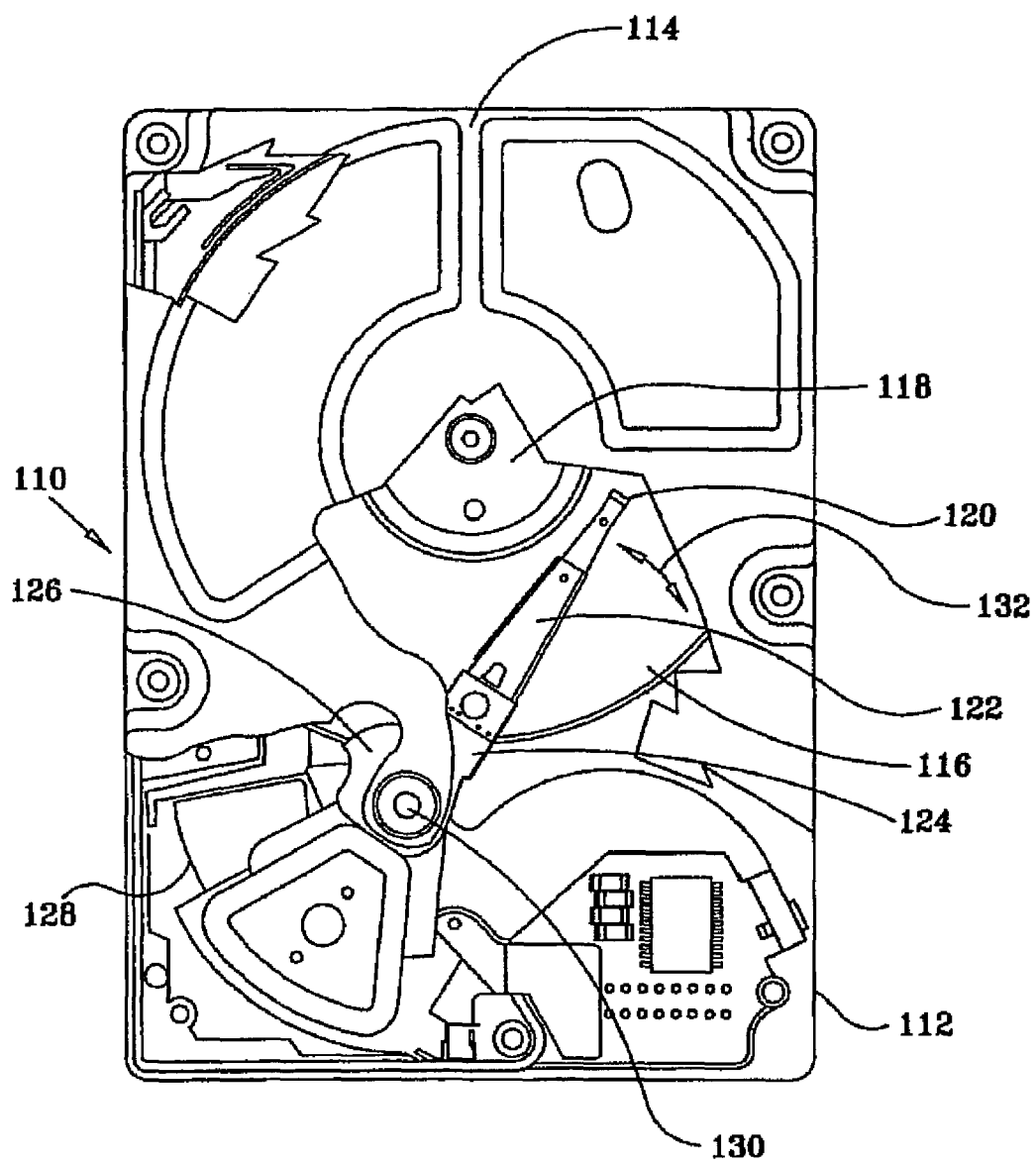
FIG. 1 shows a top view of a disc drive data storage system in accordance with one embodiment of the present invention.

A fluid bearing motor. The fluid bearing motor includes a stationary sleeve, a backiron, a hub coupled to the backiron, and a gap forming component. The hub is operable to rotate with respect to the stationary sleeve. The gap forming component is attached to the stationary sleeve and forms a gap between the stationary sleeve and the backiron. The size of the gap dynamically changes in response to changes in temperature.

According to one embodiment, a fluid bearing motor may include a stationary sleeve, a backiron, a hub coupled to the backiron, and a gap forming component. The hub is operable to rotate with respect to the stationary sleeve. The gap forming component may be attached to the stationary sleeve and forms a gap between the stationary sleeve and the backiron.

The gap size changes in response to changes in temperature. It is appreciated that the hub lifts up axially when the hub rotates, thereby increasing the size of the gap. The axial lift decreases in response to an increase in temperature. The size of the gap is reduced in response to an increase in temperature. The fluid bearing motor may include a fluid circulation path formed between the backiron and the stationary sleeve and removes air from a journal bearing formed by the stationary sleeve. In one embodiment, the gap may be less than 50 micrometers.

The fluid bearing motor may further include a seal operable to contain a fluid within the fluid circulation path. It is appreciated that the gap may be formed axially.

In one embodiment, a fluid bearing motor may include a first component, a second component, and an adjustable gap component. The second component is operable to rotate with respect to the first component. According to one embodiment, the adjustable gap component is coupled to the first component. The adjustable gap component forms a gap with the second component. It is appreciated that the gap changes in size responsive to changes in temperature.

According to one embodiment the gap size decreases responsive to an increase in temperature. In one embodiment, the gap may be less than 50 micrometers. The second component lifts up axially responsive to a thrust bearing during rotation. The amount of axial lift changes responsive to changes in temperature, e.g., the amount of the lift decreases responsive to an increase in temperature.

In one particular embodiment, a motor includes a stationary sleeve, a shaft, a hub, a backiron, and an adjustable gap forming component. The shaft is operable to rotate with respect to the stationary sleeve. The hub is operable to rotate with respect to the stationary sleeve in response to the shaft rotating. According to one embodiment, the backiron is affixed to the hub and further affixed to the shaft. The adjustable gap forming component is attached to the stationary sleeve and forms a gap between the stationary sleeve and the backiron. The gap size changes in response to the hub rotation. Moreover, the gap size changes responsive to changes in temperature.

According to one embodiment, the hub lifts up axially when the hub rotates. Thus, the axial lift of the hub increases the gap size. The axial lift of the hub decreases responsive to an increase in temperature.

According to one embodiment, the gap size decreases in response to an increase in temperature. In one exemplary embodiment, the gap size is less than 50 micrometers.

Accordingly, the established gap according to the embodiments may be reduced. Furthermore, the gap is adjusted as temperature changes, thereby compensating for any increase in oil evaporation rate with increased temperature. Moreover, the gap adjusts as the hub lifts off. As a result, the gap according to the embodiments of the present invention may further reduce oil evaporation rate.

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Generally, the terms "axially" or "axial direction" refers to a direction along a centerline axis length of a shaft, e.g., along axis 260 of shaft 202, and "radially" or "radial direction" refers to a direction perpendicular to the centerline axis 260, and passing through centerline axis 260. The terms "upper", "lower", "top", "bottom", "height" and the like, are applied in a sense related to normal viewing of the figures rather than in any sense of orientation during particular operation. These orientation labels are provided to facilitate and aid understanding of the figures as described in this description and should not be construed as limiting the scope of the embodiments.

Oil evaporation and oil leakage may lead to excessive bearing wear in fluid dynamic bearing motors. Oil evaporation may be controlled using a small gap, e.g., labyrinth, separating the oil from outside components. According to one embodiment, the gap may reduce the amount of oil that escapes an oil channel or an oil reservoir. The effectiveness of the gap may vary depending on various factors, e.g., gap positioning, gap length, and gap area. In one embodiment, the gap may be dynamically reduced.

Embodiments enable the gap to be adjusted to a desired and accurate area. In one embodiment, the gap controls fluid evaporation of a fluid dynamic bearing motor. In one embodiment the gap size adjusts as temperature changes. For example, the size of the gap may automatically be reduced at higher temperatures to prevent oil evaporation that occurs at higher temperatures. It is appreciated that the gap, e.g., labyrinth, according to one embodiment reduces oil evaporation that occurs more readily for low viscosity oils. Furthermore, the adjustable gap may increase the performance of low profile motors with limited area available for axial gap.

It is appreciated that the adjustable gap for reducing oil evaporation in accordance with embodiments may be used in various devices, e.g., disc drive memory systems, low profile disc drive memory systems, spindle motors, brushless DC motors, ball bearing assemblies, fluid dynamic bearings, hydrodynamic bearings, hydrostatic bearings, stationary and rotatable components such as motors with conical bearings, etc. It is further appreciated that the gap according to embodiments may be employed with a fixed shaft or a rotating shaft.

Referring to FIG. 1, a top view of a disc drive data storage system 110 in accordance with one embodiment of the present invention is shown. The disc drive 110 includes a housing base 112 that forms a sealed environment with a cover 114. The sealed environment protects the internal components from contamination by elements outside of the sealed environment. The disc drive 110 further includes a disc pack 116, which is mounted for rotation on a spindle motor (described in FIG. 2) by a disc clamp 118.

The disc pack 116 includes a plurality of individual discs mounted for co-rotation about a central axis. Each disc surface may be associated with heads 120 (read head and write head) operable to communicate with the disc surface. In one exemplary embodiment, heads 120 are supported by flexures 122. The flexures are attached to head mounting arms 124 of actuator body 126.

According to one embodiment, an actuator may be a rotary moving coil actuator that includes a voice coil motor 128. The voice coil motor 128 rotates the actuator body 126 with its attached heads 120 about a pivot shaft 130. Accordingly, the heads 120 may be positioned over a desired data track along an arc path 132. As such, heads 120 may read and write magnetically encoded information on the surfaces of the disc pack 116 at selected locations.

A flex assembly may provide electrical connection paths for the actuator assembly while allowing pivotal movement of the actuator body 126. The flex assembly (not shown) terminates at a flex bracket for communication to a printed circuit board mounted to the bottom of the disc drive 110 connected to head wires. The head wires are routed along the actuator arms 124 and the flexures 122 to the heads 120. The printed circuit board may include a circuitry for controlling the write currents applied to the heads 120 during a write operation and a preamplifier for amplifying read signals generated by the heads 120 during a read operation.

Figure 2:
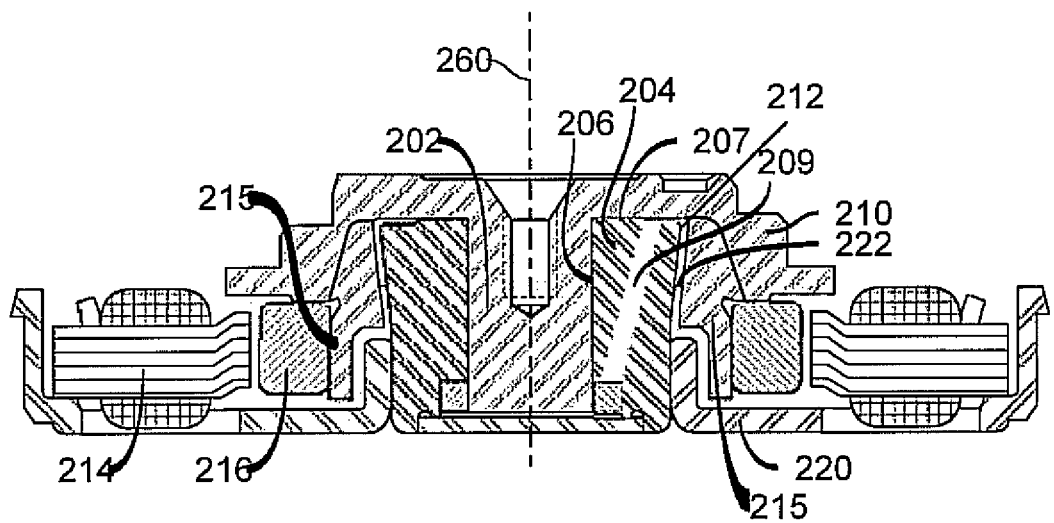
FIG. 2 shows a sectional side view of a fluid dynamic bearing spindle motor in accordance with one embodiment of the present invention.

Referring now to FIG. 2, a sectional side view of a fluid dynamic bearing spindle motor in accordance with one embodiment is shown. The spindle motor includes a stationary component and a rotatable component. The rotatable component rotates relative to the stationary component and defines a fluid dynamic journal bearing 206 and a thrust bearing 207 there between.

In this exemplary embodiment, the rotatable components include a shaft 202 and a hub 210. The hub 210 includes a disc carrier member that supports the rotation of the disc pack 116 about the shaft 202. The shaft 202 and the hub 210 are affixed to a backiron 215 and a magnet 216. One or more magnets 216 are attached to a periphery of backiron 215.

The magnets 216 interact with a stator winding 214 attached to a base 220 to cause the hub 210 to rotate. The magnets 216 may be formed as a unitary annular ring or may be formed as a plurality of individual magnets that are spaced about the periphery of hub 210. The magnets 216 are magnetized to form two or more magnetic poles. The stationary components include a sleeve 204 and the stator winding 214 affixed to the base 220. The fluid dynamic journal bearing 206 is established between the sleeve 204 and the shaft 202.

According to one embodiment, fluid, e.g., lubricating oil or a ferromagnetic fluid, fills interfacial regions between shaft 202 and sleeve 204 as well as between other stationary and rotatable components. It is appreciated that the lubricating fluid described herein is exemplary and not intended to limit the scope of the embodiments of the present invention. For example, the fluid may include a lubricating liquid or a combination of a lubricating liquid and lubricating gas.

In one embodiment, the shaft 202 and the sleeve 204 include pressure generating grooves. It is appreciated that the pressure generating grooves may include asymmetric grooves and/or symmetric grooves. Asymmetric grooves and symmetric grooves may have a pattern including one of a herringbone pattern and a sinusoidal pattern. The herringbone pattern and the sinusoidal pattern are operable to induce fluid flow in the interfacial region in order to generate a localized region of dynamic high pressure and radial stiffness.

It is appreciated that pressure is built up in each of its grooved regions when the shaft 202 rotates. According to one embodiment, the shaft 202 supports the hub 210 for constant rotation.

In one exemplary embodiment, a fluid circulation path 209 is formed through the sleeve 204 to circulate the fluid through the journal bearing 206. The fluid circulation path 209 may purge air from the journal bearing 206 via the reservoir 212 contained by fluid meniscus 222.

Figure 3:
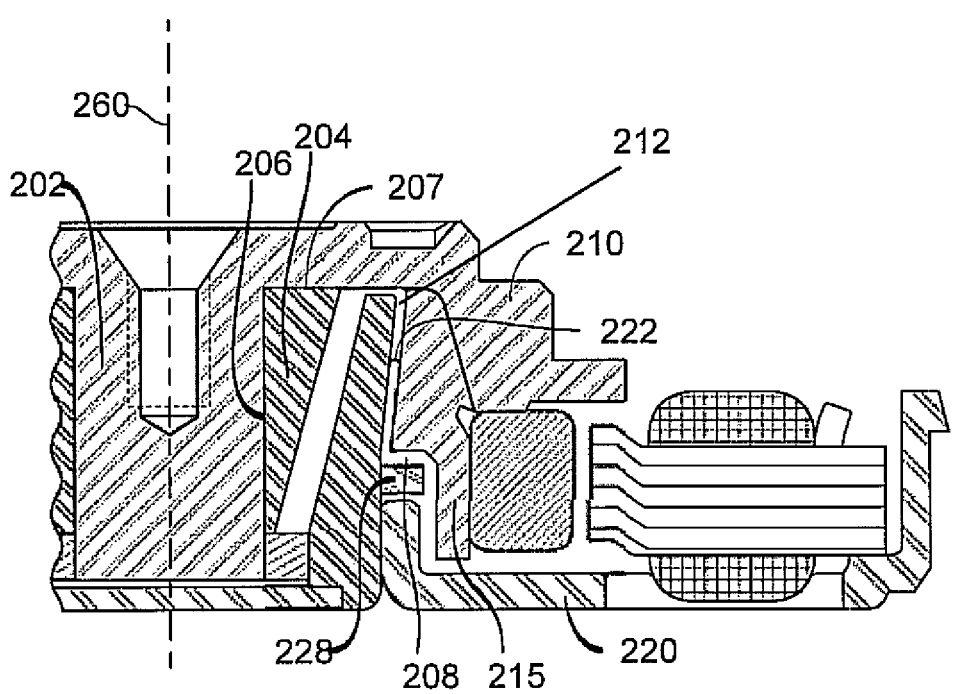
FIG. 3 shows one sectional side view of a fluid dynamic bearing motor in accordance with one embodiment of the present invention.

Referring now to FIG. 3, one sectional side view of a fluid dynamic bearing motor in accordance with one embodiment of the present invention is shown. In this embodiment, the fluid dynamic bearing motor includes a labyrinth component 228 adjoining the sleeve 204. A gap 208, e.g., labyrinth, is formed between the labyrinth component 228 and the backiron 215. The gap 208 formed by the labyrinth component 228 dynamically adjusts in size, thereby reducing oil evaporation as the temperature increases. It is appreciated that the fluid meniscus 222 may contain the bearing fluid sealed therein. It is appreciated that in one exemplary embodiment the gap 208 may be situated beyond the fluid dynamic bearing fluid and the meniscus 222 sealing the fluid dynamic bearing fluid.

The gap 208 may be accurately adjusted to a desired area, as described in FIGS. 4 and 5 below. The length of the gap 208 may vary from 0 micrometers to 15 micrometers (a micro-labyrinth gap in one example). According to one embodiment, the length is measured from the labyrinth component 228 to the stationary component. In one exemplary embodiment, the length is measured from the labyrinth component 228 to the rotatable component, e.g., backiron 215, when the rotatable component is stationary with respect to the stationary component.

It is appreciated that larger gaps, e.g., labyrinths, may be established. For example, a labyrinth gap of greater than 15 micrometers (um) may be established when the rotatable component, e.g., backiron 215, is stationary with respect to the stationary component. It is appreciated that a gap smaller than 50 um is achievable.

According to one embodiment, the hub 210 lifts up axially relative to the sleeve 204 as the motor spins. The axial lift of the hub 210 is due in part to a force created by the thrust bearing 207. The distance of lift off is described as fly height.

In an embodiment, the gap 208 increases in area due to the occurrence of fly height when the hub 210 rotates with respect to the sleeve 204. It is appreciated that the fly height occurs after the gap 208 is adjusted and established. In one exemplary embodiment, the gap 208 between the facing surfaces of the labyrinth component 228 and the backiron 215 is set to 20 micrometers or less when the hub 210 is rotating relative to the sleeve 204. It is appreciated that a gap of 20 micrometers may be established provided that the fly height is 5 micrometers and a previously set labyrinth gap is 15 micrometers or less.

It is appreciated that gap 208 extending radially is exemplary and not intended to limit the scope of the present invention. For example, the gap may extend axially.

The area of the gap 208 may change and adjust automatically and dynamically as the temperature of the fluid dynamic bearing changes. In one exemplary embodiment, the labyrinth component 228, a stationary component, e.g., sleeve 204, or a rotatable component, e.g., hub 210, move in response to changes in temperature, thereby dynamically changing the area of the gap 208. For example, the gap 208 adjoining the journal bearing 206 may extend substantially in the same direction as the thrust bearing 207. It is appreciated that the terms area of the gap 208 and size of the gap 208 are used interchangeably throughout the detailed description.

In one exemplary embodiment, the fly height changes as motor temperature changes. For example, the fly height of the hub 210 is lower when the temperature is higher and vice versa. The fly height is also related to changes in oil viscosity as temperature changes.

In one embodiment, the gap automatically adjusts along with hub 210 lift off, as temperature changes. For example, the gap is reduced at high temperatures when fluid evaporation is greater. As a result, the change in the gap size compensates for the increased fluid evaporation rate. Therefore, gap 208 reduces fluid evaporation from the fluid dynamic bearing motor. Reducing fluid evaporation is particularly useful for low viscosity oils. Furthermore, reducing fluid evaporation is useful in low profile motors due to limited availability of axial gaps.

Figure 4:
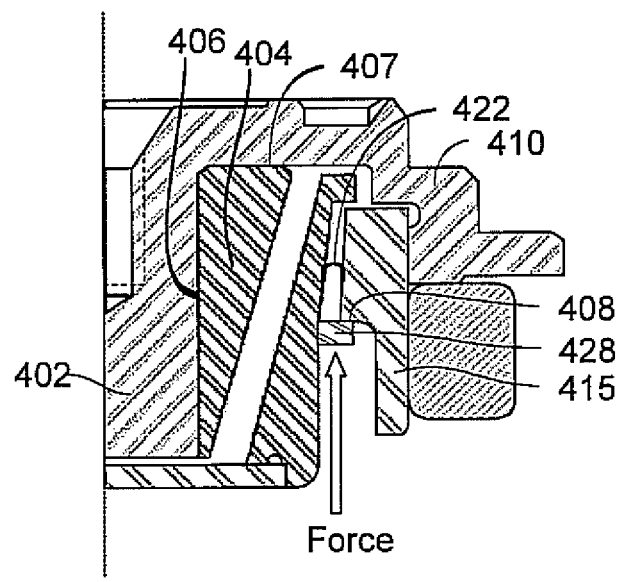
FIG. 4 shows a portion of a sectional side view of a fluid dynamic bearing motor under pressure in accordance with one embodiment of the present invention.

Referring now to FIG. 4, a portion of a sectional side view of a fluid dynamic bearing motor under pressure in accordance with one embodiment of the present invention is shown. The fluid dynamic bearing motor includes a rotatable shaft 402 and a hub 410. The hub 410 rotates with respect to a stationary sleeve 404 forming a fluid dynamic bearing 406 and a thrust bearing 407. A fluid seal 422 contains the bearing fluid.

It is appreciated that specific physical dimensions may vary within certain practical limits without significantly affecting the functionality of a motor. Tolerances may be specified to allow reasonable leeway for imperfections and inherent variability without compromising performance. The present invention can reduce or eliminate design concerns for component tolerance when establishing a gap, e.g., gap 408. For example, embodiments of the present invention allow a smaller gap that may be automatically adjusted to a desired and accurate area.

In one embodiment, a labyrinth component 428 is forced toward a backiron 415 until the two components become in contact. It is appreciated that in one exemplary embodiment, the labyrinth component 428 may be forced toward some other component, e.g., a stationary component or a rotatable component, in order to make contact with the backiron 415. Any means may be used to apply the force. For example, hand pressing may exert the desired force.

In one embodiment, the gap is established when the rotatable component, e.g., hub 410, is stationary with respect to the stationary component, e.g., the sleeve 404. The area of the gap 408 is not limited by component tolerances of the labyrinth component 428, the backiron 415, or any rotatable or stationary components. In one embodiment, a component spring back by the labyrinth component 428 or the facing component may occur.

According to one embodiment, the hub 410 dynamically lifts up axially with respect to the sleeve 404 as the motor spins. The axial lift of the hub 410 is due in part to forces created by the thrust bearing 407. In an embodiment, the gap 408 increases in area due to the fly height that occurs when hub 410 rotates with respect to the sleeve 404. It is appreciated that the fly height occurs after the gap 408 is adjusted and established. In one exemplary embodiment, a gap 408 size of about 5 micrometers can be established when the hub 410 rotates relative to the sleeve 404. It is appreciated that a gap size of 5 micrometers may be established provided that a fly height is 5 micrometers and a previously set gap is 0 micrometers. It is appreciated that the gap may be slightly larger depending on the occurrence of spring back of a facing component. The gap 408 may be adjusted to greater than 5 micrometers, as described below with reference to FIG. 5. In one embodiment, the gap 408 is established by placing the labyrinth component 428 in contact with a stationary component and/or a rotatable component.

Accordingly, the gap automatically adjusts as the hub lifts off and as the temperature changes. Thus, the gap is reduced at high temperatures when fluid evaporation is greater. As a result, the dynamic change in the gap size for reducing fluid evaporation rate from the fluid dynamic bearing motor. Reducing fluid evaporation is particularly useful for low viscosity oils. Furthermore, reducing fluid evaporation is useful in low profile motors due to limited availability of axial gaps.

Figure 5:
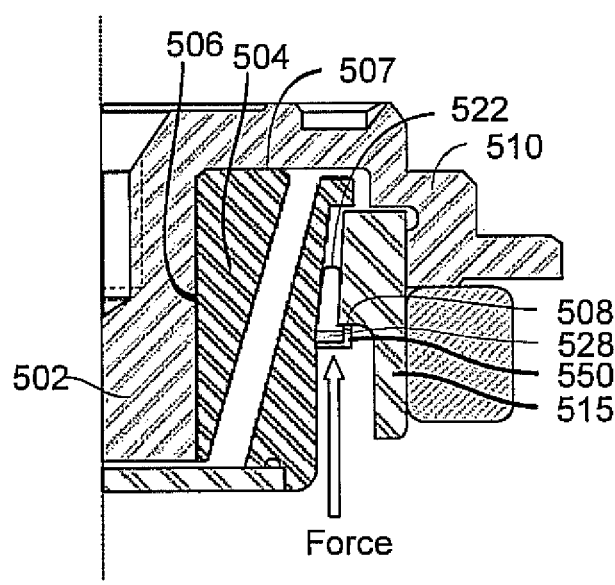
FIG. 5 shows a portion of a sectional side view of a fluid dynamic bearing motor under pressure using an adjustable gap setting device in accordance with one embodiment of the present invention.

Referring now to FIG. 5, a portion of a sectional side view of a fluid dynamic bearing motor under pressure using an adjustable gap setting device in accordance with one embodiment of the present invention is shown. The fluid dynamic bearing motor includes a rotatable shaft 502 and a hub 510. The hub 510 rotates with respect to a stationary sleeve 504 forming a fluid dynamic bearing 506 and a thrust bearing 507. A fluid seal 522 contains the bearing fluid.

It is appreciated that the embodiments of the present invention may reduce design concerns for component tolerance when establishing a labyrinth gap 508 because the gap 508 is adjustable to a desired and accurate area. In one embodiment, labyrinth component 528 is forced toward a backiron 515 using a gap setting device 550.

The gap setting device 550 is used to establish the labyrinth gap 508 between the labyrinth component 528 and the backiron 515. It is appreciated that the gap setting device 550 may also be used to establish the labyrinth gap 508 between the labyrinth component 528 and a stationary component, e.g., the sleeve 504, or a rotatable component, e.g., the hub 510. In this exemplary embodiment, the gap setting device 550 includes a "lip" or protrusion extending beyond the labyrinth component 528 and toward the backiron 515. The lip portion is operable to establish the labyrinth gap 508. It is appreciated that the lip portion is exemplary and not intended to limit the scope of the embodiments of the present invention. For example, a plate without a lip may used.

In one embodiment, the gap setting device 550 applies pressure to the labyrinth component 528 toward the backiron 515. The application of this force ultimately causes the gap setting device 550 to contact the backiron 515. Thus, the gap 508 is formed between the labyrinth component 528 and the backiron 515. After the labyrinth gap 508 is set, the gap setting device 550 may be removed.

According to one embodiment, the gap setting device 550 applies pressure to the labyrinth component 528 toward a stationary component or a rotatable component until the gap setting device 550 becomes in contact with the stationary or the rotatable component. In an embodiment, the labyrinth gap 508 is established when the rotatable component, e.g., the hub 510, is stationary with respect to the stationary component, e.g., the sleeve 504.

Any means may be used to apply the force. For example, hand pressure may exert the desired force to the gap setting device 550. Applying force to the gap setting device 550 transfers the applied force to the labyrinth component 528. Accordingly, the area of the labyrinth gap 508 is not limited by component tolerances of the labyrinth component 528, the backiron 515, or rotatable or stationary components. In one embodiment, a component spring back by the labyrinth component 528 against the gap setting device 550 may occur.

The labyrinth gap 508 is equal to the distance from the labyrinth component 528 to the backiron 515 (or to a stationary or rotatable component) when the rotatable component is stationary with respect to the stationary component. In one embodiment, the labyrinth gap 508 is equal to the distance that the gap setting device 550 extends between facing surfaces of the labyrinth component 528 and the backiron 515.

A labyrinth gap of less than 20 micrometers may be established between the facing surfaces of the labyrinth component 528 and the backiron 515 when the rotatable component e.g., the hub 510, rotates relative to the stationary component, e.g., the sleeve 504, and when the facing components lift apart. It is appreciated that a labyrinth gap of less than 20 micrometers may be established between the facing surfaces of the labyrinth component 528 and a stationary component, e.g., the sleeve 504, or a rotatable component, e.g., the hub 510. It is appreciated that setting a labyrinth gap size of less than 20 micrometers is exemplary and not intended to limit the scope of the present invention. For example, the labyrinth gap may be set to greater than 20 micrometers using the gap setting device 550.

The labyrinth gap 508 is established by situating the gap setting device 550 to establish the labyrinth gap 508 between the labyrinth component 528 and a stationary component, e.g., the sleeve 504, or a rotatable component, e.g., the hub 510. In an embodiment, the labyrinth gap 508 is smaller in area than can be provided if component tolerance were a design consideration.

Accordingly, the gap automatically adjusts along as the hub lifts off and as the temperature changes. Thus, the gap size is reduced at high temperatures when fluid evaporation is greater. As a result, the change in the gap size reduces the overall fluid evaporation rate of the fluid dynamic bearing motor. Reducing fluid evaporation may be useful for low viscosity oils. Furthermore, reducing fluid evaporation may be useful in low profile motors due to limited availability of axial gaps.

Figure 6:
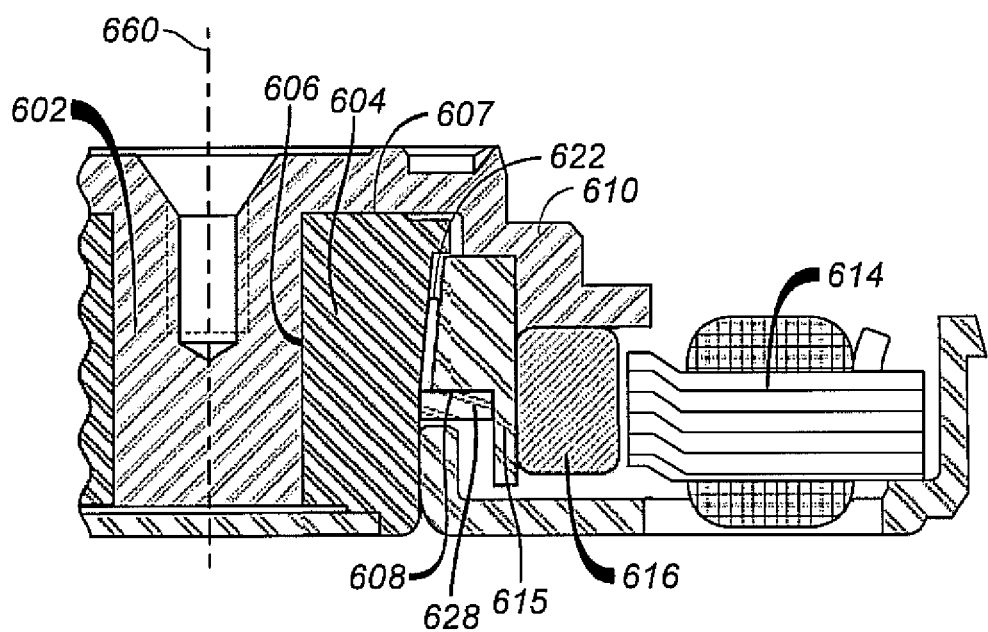
FIG. 6 shows a second sectional side view of a fluid dynamic bearing motor in accordance with one embodiment of the present invention.

Referring now to FIG. 6, a second sectional side view of a fluid dynamic bearing motor in accordance with one embodiment of the present invention is shown. The fluid dynamic bearing motor includes a rotatable shaft 602 and a hub 610. The hub 610 rotates with respect to a stationary sleeve 604 forming a fluid dynamic bearing 606 and a thrust bearing 607. A fluid seal 622 contains the bearing fluid therein.

A labyrinth gap 608 is dynamically adjusted to a desired and accurate area (as described with respect to FIGS. 4 and 5). In this embodiment, the rotatable component, e.g., the hub 610, is stationary with respect to the stationary component, e.g., the sleeve 604. Accordingly, a labyrinth component 628 becomes in contact with a backiron 615.

According to one embodiment, the hub 610 dynamically lifts up axially with respect to the sleeve 604 as the motor spins. The axial lift of the hub 610 is due in part to forces created by the thrust bearing 607. In one embodiment, the labyrinth gap 608 increases in area when the hub 610 rotates with respect to the sleeve 604 subsequent to establishment of the labyrinth gap 608.

It is appreciated that the labyrinth gap 608 size between the facing surfaces of the labyrinth component 628 and the backiron 615 may become less than 20 micrometers when the hub 610 rotates relative to the sleeve 604. It is appreciated that the labyrinth gap 608 extending radially is exemplary and is not intended to limit the scope of the embodiments of the present invention. For example, the labyrinth gap 608 may extend axially. It is further appreciated that the labyrinth gap 608 being situated below a fluid seal 622 is exemplary and not intended to limit the scope of the embodiments of the present invention.

Accordingly, the gap is dynamically adjusted as temperature changes, thereby compensating for any increase in oil evaporation rate as temperature increases. Moreover, the gap adjusts as the hub lifts off. As a result, the gap further reduces the oil evaporation rate.

Embodiments described herein may reduce oil evaporation while reducing power consumption with respect to a fluid bearing of a motor. More particularly, embodiments may reduce oil evaporation as temperature increases.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:
1. An apparatus comprising:
a stationary sleeve;
a shaft operable to rotate with respect to the stationary sleeve;
a hub operable to rotate with respect to the stationary sleeve in response to the shaft rotating;
a backiron affixed to the hub and further affixed to the shaft; and
an adjustable gap forming component attached to the stationary sleeve and radially extending between the backiron and a base, wherein
the adjustable gap forming component forms radially extending gaps above and below the adjustable gap forming component, and the radially extending gaps above and below the gap forming component are parallel to each other
the adjustable gap forming component is movable with respect to the stationary sleeve, and
the adjustable gap forming component forms a gap with the backiron.

2. The apparatus of claim 1, wherein the hub lifts up axially when the hub rotates, and wherein the size of the gap with the backiron increases in response to axial lift of the hub.

3. The apparatus of claim 1, wherein the hub lifts up axially when the hub rotates, and wherein axial lift of the hub decreases in response to temperature increase.

4. The apparatus of claim 1, wherein the size of the gap with the backiron decreases in response to temperature increase.

5. The apparatus of claim 1, wherein the size of the gap with the backiron is less than 50 micrometers.

* * * * *